United States Patent [19]
Sanford

[11] Patent Number: 5,960,738
[45] Date of Patent: Oct. 5, 1999

[54] MILKING CLUSTER HOSE POSITIONER

[75] Inventor: Scott A. Sanford, Oregon, Wis.

[73] Assignee: DEC International, Inc., Madison, Wis.

[21] Appl. No.: 09/206,531

[22] Filed: Dec. 7, 1998

[51] Int. Cl.$^6$ ................................................ A01J 5/00
[52] U.S. Cl. ........................................................ 119/14.45
[58] Field of Search ........................... 119/14.45, 14.1, 119/14.11, 14.12, 14.13, 14.03, 520

[56] References Cited

U.S. PATENT DOCUMENTS

| | | | |
|---|---|---|---|
| 2,125,344 | 8/1938 | Hodsdon | 119/14.45 |
| 3,079,891 | 3/1963 | Miller | 119/14.45 |
| 3,999,516 | 12/1976 | Shulick | 119/14.1 |
| 5,178,095 | 1/1993 | Mein . | |
| 5,218,924 | 6/1993 | Thompson et al. . | |
| 5,586,518 | 12/1996 | Carrano . | |

OTHER PUBLICATIONS

Surge Parallel Stall Milk Hose Support, Part No. 95684.
"Milking Parlor Hygiene and Recommended Milking Procedures", Mills Farm Life, Fall 1998, p. 8.

Dairy Express Hose Supports, Unit Hangers, Catalogue p. 25.

Alfa Laval Part No. 988837–01.

*Primary Examiner*—Thomas Price
*Attorney, Agent, or Firm*—Andrus, Sceales, Starke & Sawall

[57] ABSTRACT

In a milking cluster (10) for a dairy animal (12), a milk hose positioner (62) bears against the parlor curb (24) and supports the milk hose (48) and applies in combination with the milk hose (48) a forward force to the milking claw (28) to better balance weight distribution on the teats (16). The positioner (62) stays on the milk hose (48) when the teatcups (34) are removed from the teats (16) and the milking cluster (10) is moved from its milking position. The positioner can move forwardly and laterally to accommodate animal movement.

26 Claims, 4 Drawing Sheets

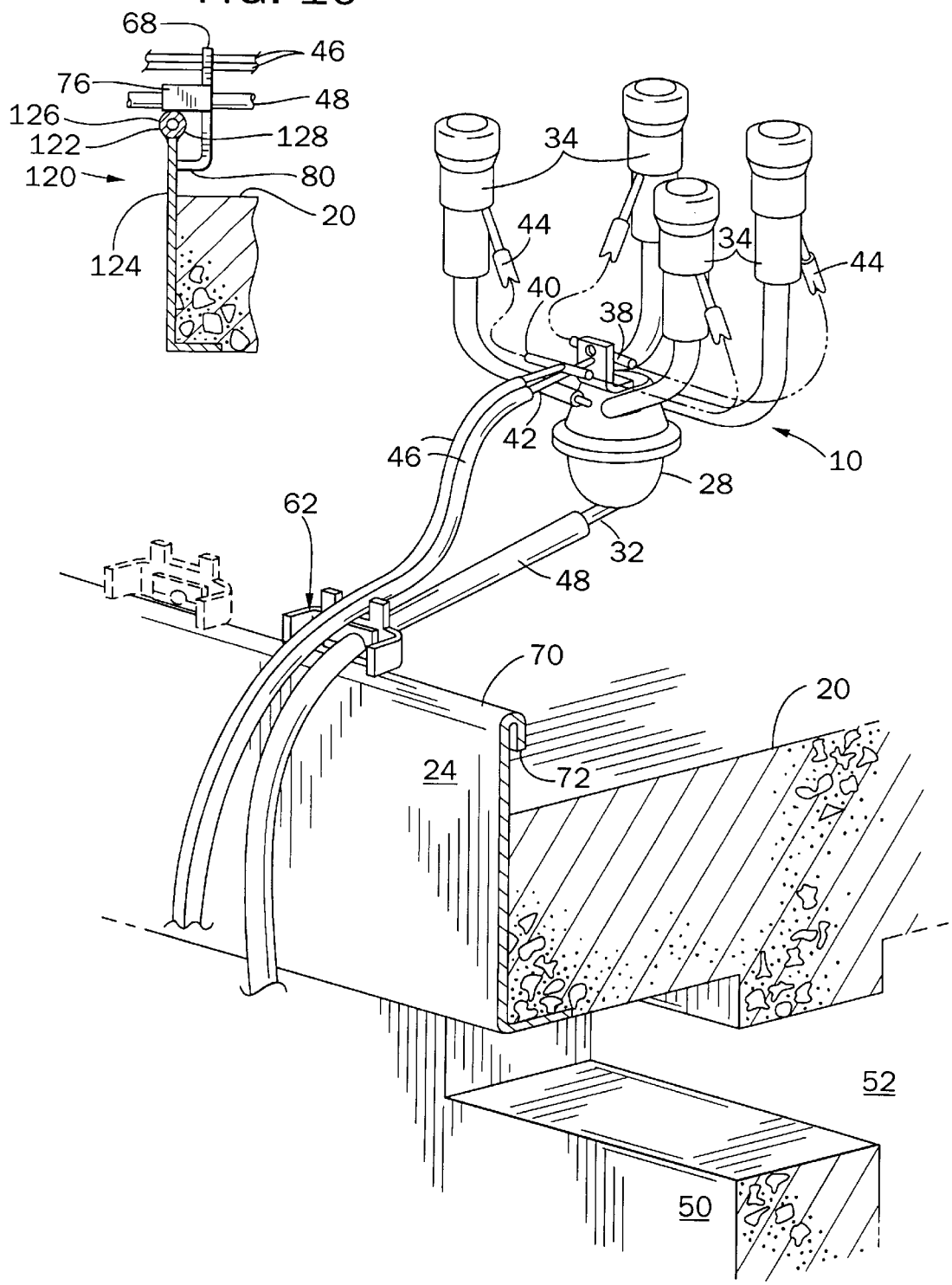

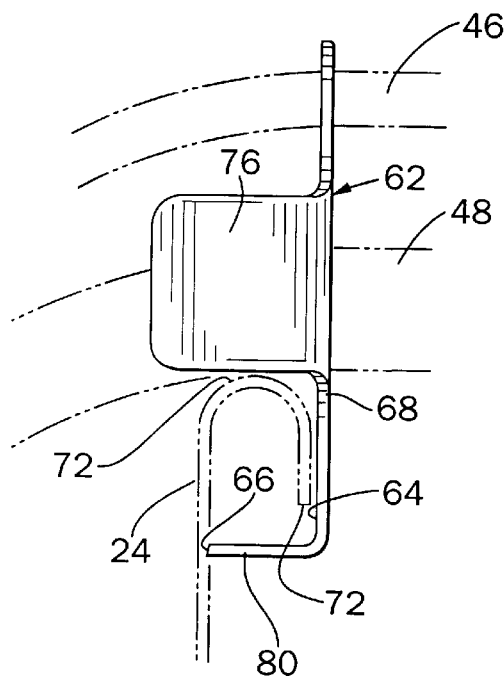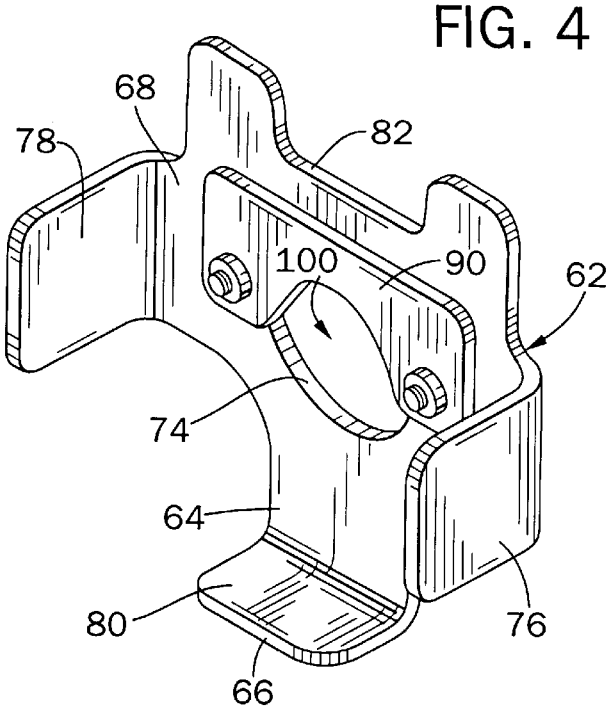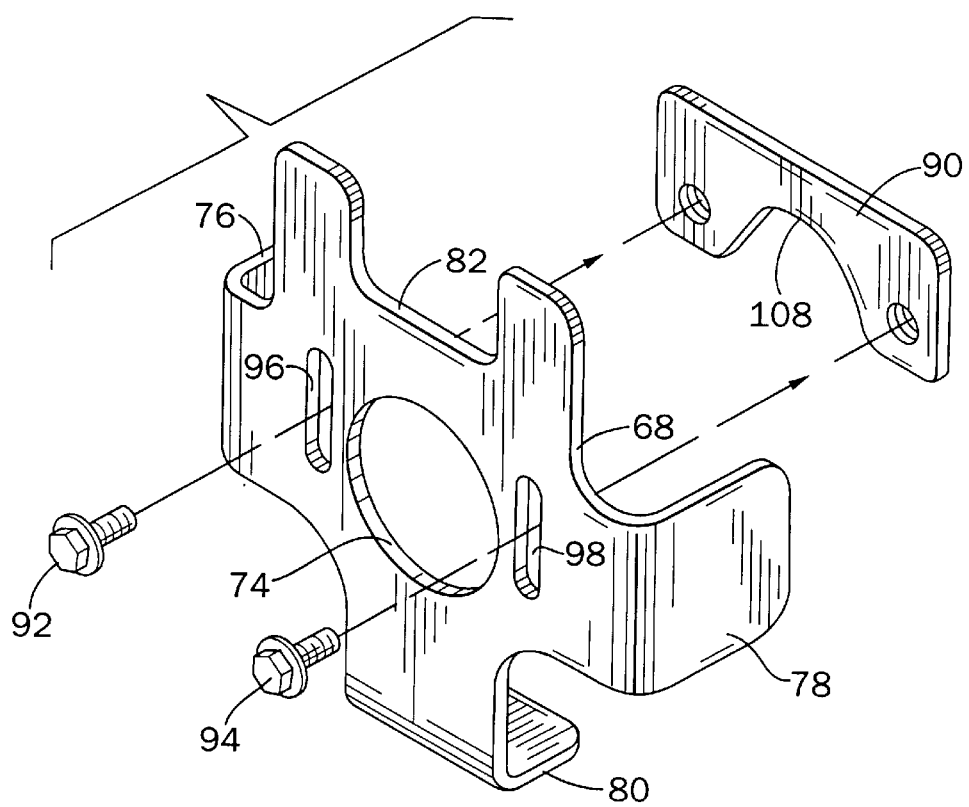

MILKING CLUSTER HOSE POSITIONER

BACKGROUND AND SUMMARY OF THE INVENTION

The invention relates to dairy equipment, and more particularly to milking clusters, and further particularly to a milk hose positioner.

A milking cluster is used for milking a dairy animal such as a cow having an udder and a plurality of teats. The animal is milked in a parlor which may have a milking platform for supporting the animal, a pit for supporting a milking attendant, and a curb between the milking platform and the pit. The animal has a milking position on the platform with its head facing forwardly away from the pit, and its rump facing rearwardly toward the pit, such that the attendant has access to the teats. The milking cluster includes a claw having a plurality of inlets, and an outlet. The milking cluster has a milking position with the claw beneath the udder. The cluster further includes a plurality of teatcups, each connected to a respective teat, a plurality of milk tubes, each connecting a respective claw inlet to a respective teatcup, an air fork having a plurality of outlets, and one or more inlets, a plurality of air tubes, each connecting a respective air fork outlet to a respective teatcup, one or more vacuum pulsation lines connected to the one or more air fork inlets, and a milk hose connected to the claw outlet and extending over the curb.

Positioning the milking unit squarely under the cow's udder such that the weight distribution is nearly equal on all quarters aids in extracting milk from the cow quickly, gently and completely. Positioning of milking units has been a challenge from the advent of the first milking units. Bucket milking units were supported by straps over the cow's back. Pipeline milking units use wire forms that hook on the milk pipeline or the stanchion frame. In herringbone and tandem parlors, an arm type device is used. In all cases, except the bucket milking unit, the hook or arm is supporting the weight of the milk hose so that the weight distributed by the milking claw is nearly even. When the angle of the milk hose is correct, the milking unit should be positioned squarely under the udder. In all cases mentioned, the lack of a support device results in an increased amount of weight being applied to the front quarters of the cow.

With the advent of the parallel type parlor stall, the weight distribution has become more of an issue. In a pipeline or herringbone type set-up, if no hose support is used, the milk hose is usually long enough that the hose would angle down and rest on the floor, such that some of the hose weight is supported by the floor. However in a parallel stall with a low milk line, the milk hose usually goes over the curb and under the platform to a milk meter, milk sensor or directly into the milk line. There is often three feet of milk hose that has to be supported by the milking unit if no device is used to support the weight of the hose. The unsupported weight will attempt to pull the unit out from under the cow, resulting in very little weight being applied to the rear quarters, and a majority of the weight being applied to the front quarters. This results in an incomplete extraction of milk from the rear quarters in some cases. To get nearly even weight distribution on all four teats of a dairy cow, the milk hose needs to be supported and a slight forward force applied to the milking unit.

Dairy equipment manufacturers have provided a number of devices to aid in supporting the weight of the milk hose in parallel parlors. These include curb mounted brackets made of plastic and stainless steel, staff designs with a yoke to place the milk hose in and cords or chains that are counterweighted to support the milk hose. These designs have various disadvantages. The curb mounted hose supports generally do not accommodate but one milk hose size and have no adjustment for hose size variation. The milk hose is pinched from two sides which results in an oval cross section that is more prone to collapse. The curb-mounted brackets need to slide on the curb to allow for proper positioning behind a cow which can sometimes be difficult because of weld joints on the curb or dirt build-up. If a cow shifts forward to the point where the milk hose is under tension, the milking unit can be pulled off the cow or cause a slip which is undesirable. Being mounted to the curb, these brackets can catch on hoses and cords during milking unit detach or claw drop functions and/or be stepped on by cows as they enter the parlor and be a hazard to the operator attendant if bumped with an elbow or kicked into a bracket. These brackets do provide the ability to provide some forward pressure to the milking unit for better weight distribution. The staff style support has the above noted disadvantages of the curb mounted bracket plus it requires more movement and time to adjust and is usually in the way during milking unit attachment, but it does do a better job of positioning the hose for cows with high udders. The counterweighted cord or chain eliminates the problem with the milking unit catching on the bracket, cows stepping on it or the operator bumping it, but they have limited ability to apply forward force for even weight distribution. Some of such devices have multiple cords or chains which get twisted and tangled, causing time to be spent keeping the chains straight.

The present invention addresses and solves the above noted problems in a particularly simple and effective manner. In one form, a hose positioner is provided by a bracket that attaches to the milk hose and hooks over a parallel parlor curb to aid in supporting the weight of the milk hose and positioning the milking unit such that the milking unit stays positioned squarely under the cow's udder in a parallel parlor. The advantage of such device over prior devices is that it attaches to the milk hose, such that when the milking unit is detached, the hose support is lifted off the curb and stays with the hose so that there are no brackets to be hazards for cows or operator attendants. The positioner supports the weight of the hose and allows forward force to be applied to the claw. Because the positioner is not permanently attached to the curb, if the cow moves forward in the stall it will not apply additional tension to the milk hose other than the weight of the milk hose. If a cow shifts sideways in the stall, the positioner will slide and/or rotate to accommodate the cow's new position.

BRIEF DESCRIPTION OF THE DRAWINGS

FIG. 2 is perspective view of a portion of the structure of FIG. 1.

FIG. 3 is a side elevation view of a portion of the structure of FIG. 1 showing the hose positioner.

FIG. 4 is a perspective view from the rear of the positioner of FIG. 3.

FIG. 5 is an exploded perspective view from the front of the positioner of FIG. 4.

FIG. 10 is a view like a portion of FIG. I and shows a further embodiment.

DETAILED DESCRIPTION PRIOR ART

Figure 1:
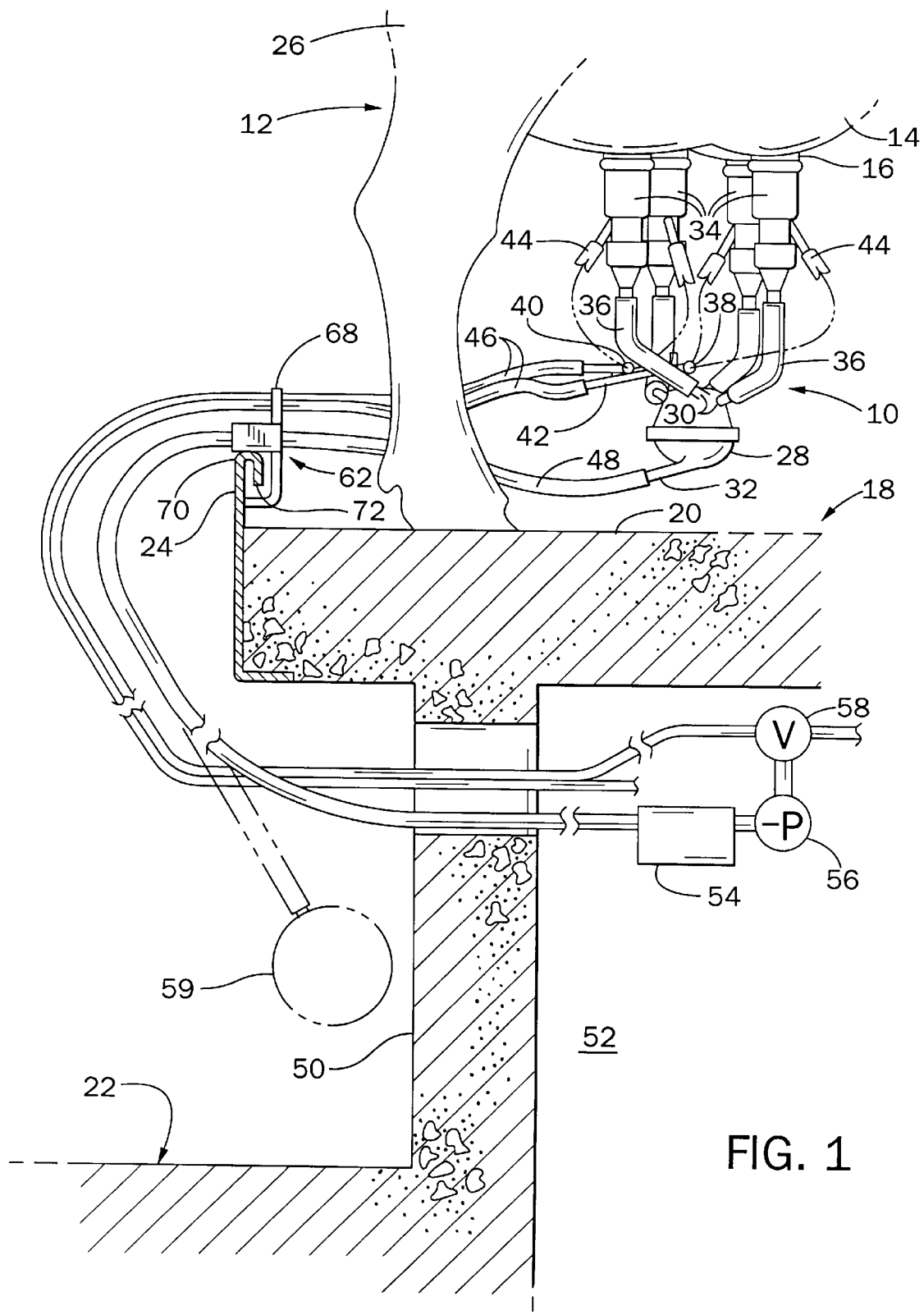
FIG. 1 is a side view partially in elevation and partially in section of a milking parlor.

FIGS. 1 and 2 show a milking cluster 10 for a dairy animal 12 such as a cow having an udder 14 and a plurality of teats 16. The animal is milked in a parlor 18 having a milking platform 20 for supporting the animal, a pit 22 for supporting a milking attendant or operator, and a curb 24 between milking platform 20 and pit 22. Dairy animal 12 has a milking position on platform 20 with its head facing forwardly, i.e. rightwardly in FIG. 1, away from the pit 22, and its rump 26 facing rearwardly, i.e. leftwardly in FIG. 1, toward pit 22, such that the attendant has access to teats 16. Milking cluster 10 includes a claw 28 having four inlets 30, and an outlet 32. The cluster has a milking position with claw 28 beneath udder 14. The cluster includes four teatcups 34, each connected to a respective teat 16. Four milk tubes 36 each connect a respective claw inlet to a respective teatcup. Air fork 38, for which further reference may be had to U.S. Pat. No. 5,586,518, incorporated herein by reference, has four outlets 40, and one or more inlets 42, in this case two such inlets. Four air tubes 44 each connect a respective air fork outlet 40 to a respective teatcup. One or more vacuum pulsation lines 46, in this case two, are connected to air fork inlets 42 and extend over curb 24. When two pulsation lines are used, a twin or Siamese pulsation line pair is preferred, provided by a pair of extruded tubes with an integral connecting web 47 therebetween, FIG. 6. This provides easier handling. A milk hose 48 is connected to claw outlet 32 and extends over curb 24. Vacuum pulsation lines 46 and milk hose 48 extend through wall 50 into basement 52 of the parlor. Milk tube 48 supplies milk to collection container 54 under vacuum from negative pressure source 56. Pulsator valve 58 alternately and cyclically applies vacuum to vacuum pulsation lines 46 from source 56, for which further reference may be had to U.S. Pat. Nos. 5,178,095 and 5,218,924, incorporated herein by reference. In an alternate embodiment, milk hose 48 extends over curb 24 to a milk pipeline in the pit as shown in dashed line at 59, which supplies the milk to collection container 54. Various other locations of milk line 59 in pit 22 or basement 52 are possible. Vacuum pulsation lines 46 may extend through wall 50 into basement 52 as shown, or to an overhead cabinet, not shown, above cow platform 20. The subject matter disclosed thus far is known in the prior art.

PRESENT INVENTION

In the present invention, a milk hose positioner 62 bears against curb 24 and supports milk hose 48 and applies in combination with hose 48 a forward force, i.e. rightwardly in FIG. 1, to claw 28. Positioner 62 is attached to milk hose 48 and stays on the hose when teatcups 34 are removed from teats 16 and the milking cluster is moved from its milking position. Positioner 62 has stop surfaces 64, 66, FIGS. 3 and 4, stopped against curb 24 when the milking cluster is in its milking position, to stop rearward movement, i.e. leftwardly in FIG. 1, of positioner 62 such that positioner 62 and hose 48 apply a forward force, i.e. rightwardly in FIG. 1, to claw 28 to better balance weight distribution on teats 16. Stop surfaces 64, 66 permit forward movement of positioner 62 if the animal steps forwardly. The stop surfaces also permit lateral movement of positioner 62 along curb 24 and/or rotational movement of positioner 62 about a vertical axis if the animal shifts sideways.

Figure 8:
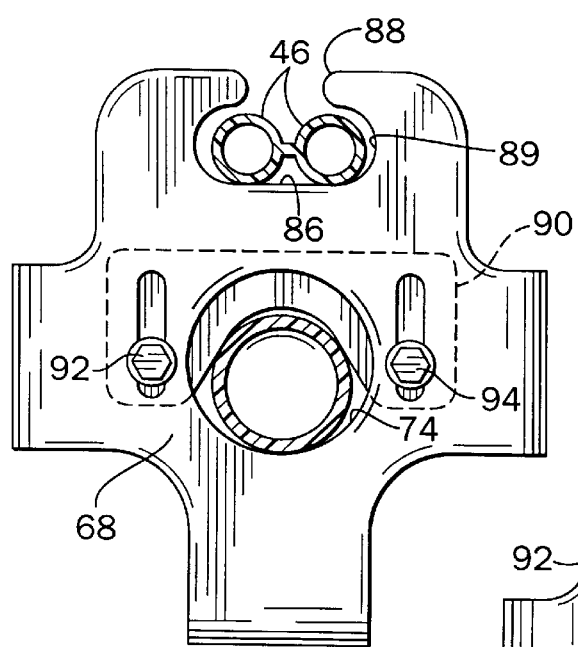
FIG. 8 is a view like FIG. 6 and shows an alternate embodiment.
Figure 9:
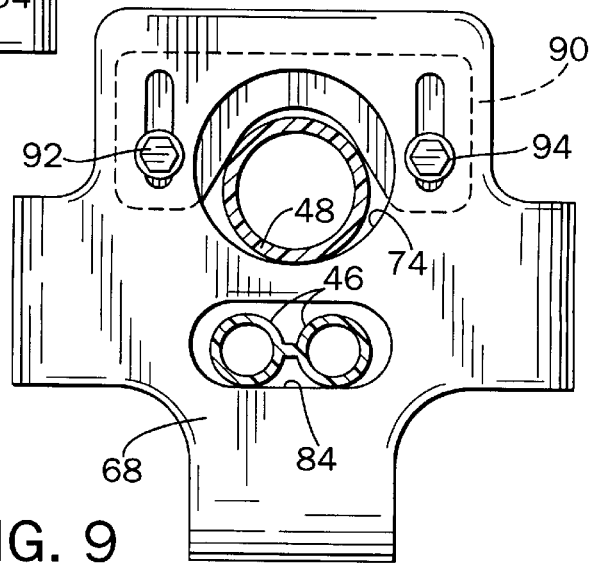
FIG. 9 is a view like FIG. 6 and shows another alternate embodiment.

Positioner 62 is provided by a bracket 68 slidable along hose 48 when the bracket is removed from the curb. Hose 48 remains stationary in bracket 68 when the milking cluster is in its milking position. Curb 24 has a top 70, and a lip 72 spaced below top 70 on the side of the curb facing the milking platform. Bracket 68 has an opening 74, FIGS. 4 and 5, receiving milk hose 48 extending therethrough, FIG. 6. Bracket 68 has bent side ears 76, 78, FIG. 4, on top 70 of curb 24, and a bent lower ear 80 under lip 72. Bracket 68 has another opening or slot 82, FIGS. 4 and 5, receiving vacuum pulsation line pair 46 extending therethrough, FIG. 6. In the embodiment in FIG. 6, opening 82 is above opening 74. In an alternate embodiment, opening 84, FIG. 9, receiving vacuum pulsation line pair 46, is below opening 74. In the embodiment in FIG. 6, opening 74 is a closed-loop slot, and opening 82 is an open-loop slot. In the embodiment in FIG. 9, opening 84 is a closed-loop slot. In the embodiment in FIG. 8, opening 86 receiving vacuum pulsation line pair 46 is an open-loop slot permitting lateral entry and exit of the vacuum pulsation line pair. Opening 86 has an entry portion 88 of a width slightly greater than the diameter of one of the vacuum pulsation lines 46. Opening 86 has a receptacle portion 89 of a width slightly greater than twice the diameter of one of the vacuum pulsation lines plus the width of web 47. This provides better retention of the vacuum pulsation line pair 46 in opening 86, yet permits easy lateral removal by merely turning the vacuum pulsation line pair 90° and then laterally removing same through exit 88.

Bracket 68 includes an adjustable clamp provided by slide plate 90, FIGS. 4 and 5, engaging milk hose 48 and applying adjustable clamping force thereagainst. The clamp is adjusted to be tight enough to hold hose 48 in place and stationary on bracket 68 to in turn apply the noted forward force to claw 28, yet loose enough to permit the attendant to slide bracket 68 along hose 48 to adjust to the distance between curb 24 and an alignment point beneath udder 14. This is desirable because it enables the attendant to adjust hose position relative to the cluster and the curb while the hose and the bracket are sitting on the curb. Slide plate 90 is mounted to bracket 68 by bolts 92, 94, and adjustment is enabled by elongated slots 96, 98 in bracket 68 and through which the bolts extend and are threaded into plate 90. The bracket and slide plate structure provides a variable guillotine opening 100 receiving milk hose 48 extending therethrough and engaging the hose with variable clamping force. Slide plate 90 is slidably mounted to bracket 68 and is moveable relative thereto, via slots 96, 98, to change the size of the opening.

Figure 6:
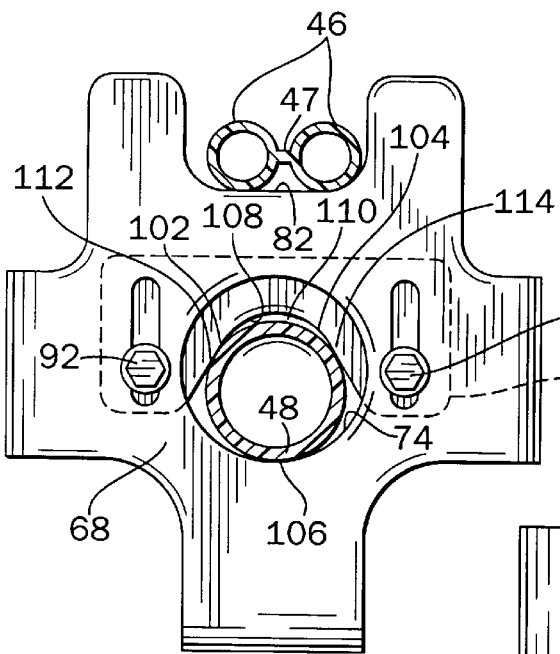
FIG. 6 is an end elevation view from the front of the positioner of FIG. 3.
Figure 7:
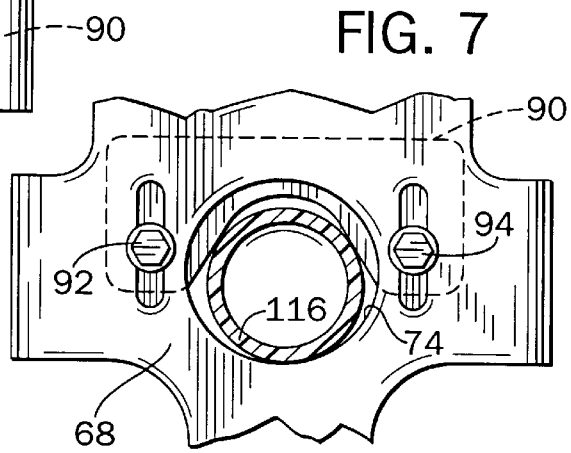
FIG. 7 is a view like FIG. 6 and shows another hose size.

Slide plate 90 and bracket 68 in combination engage hose 48 at three points 102, 104, 106, FIG. 6, spaced approximately 120° apart. This maintains a substantially circular shape of hose 48, and prevents elliptical shaping of the hose otherwise causing kinking or collapsing of the hose. Opening 74 in bracket 68 engages hose 48 at one of the noted points 106. Slide plate 90 engages hose 48 at the other two points 102, 104. Slide plate 90 has an elliptical arc 108 of smaller radius than the radius of hose 48. Arc 108 has a central portion 110, FIG. 6, spaced from hose 48. Arc 108 has end portions 112, 114 engaging hose 48. Opening 74 in bracket 68 is circular and of greater radius than the radius of hose 48. The clamp provided by slide plate 90 and bracket 68 is adjusted by loosening bolts 92 and 94 and moving slide plate 90 to enlarge the opening for a larger hose such as shown at 116 in FIG. 7, or reducing same as desired. It is preferred that the above described three point engagement be maintained.

It is preferred that lower bent ear 80 of bracket 68 be spaced below lower lip 72 of curb 24. This permits slight rocking of the bracket left-right in FIG. 3 about a horizontal axis, to further accommodate shifting of the animal. This is also preferred to facilitate a loose fit of bracket 68 on curb 24 to enable not only the noted lateral movement of bracket 68 along curb 24, i.e. into and out of the page in FIG. 3, but also rotational movement of bracket 68 about a vertical axis in FIG. 3, to further accommodate shifting movement of the animal. Bracket 68 is rockable on ears 76, 78 about top 70 of curb 24 to reduce the effective diameter of the milk hose opening through the bracket and slightly pinch the milk hose in response to a rearward force on the hose whereby to prevent rearward movement of hose 48 through opening 100 and instead apply forward reactive force countering same. Bracket 68 is manually rockable by the attendant to maximize the effective diameter of opening 100 and eliminate the noted pinching and permit sliding movement of hose 48 through such opening to in turn set the length of hose between bracket 68 and claw 28 which in turn sets the amount of reactive force applied forwardly against the claw. Side ears 76, 78 prevent bracket 68 from spinning off of the curb during side to side movement of the cow or in cases where the milk hose has become twisted. Forward motion is allowed because the bracket is not attached to the curb.

Bracket 68 may be used on various types of curbs. For example, FIG. 10 shows a curb 120 provided by a tube 122 welded on top of steel plate 124. Side ears 76, 78 of bracket 68 rest on top 126 of curb 120, comparably to top 70 of curb 24. Lower ear 80 of bracket 68 extends under lip 128 of curb 120, comparably to lip 72 of curb 24.

It is recognized that various equivalents, alternatives and modifications are possible within the scope of the appended claims.

What is claimed is:

1. A milking cluster for a dairy animal having an udder and a plurality of teats, and milked in a parlor having a milking platform for supporting the animal, a pit for supporting a milking attendant, and a curb between said milking platform and said pit, the animal having a milking position on said platform with its head facing forwardly away from said pit, and its rump facing rearwardly toward said pit, such that the attendant has access to said teats, comprising:

a claw having a plurality of inlets, and an outlet, said milking cluster having a milking position with said claw beneath said udder;

a plurality of teatcups, each connected to a respective teat;

a plurality of milk tubes, each connecting a respective claw inlet to a respective teatcup;

an air fork having a plurality of outlets, and one or more inlets;

a plurality of air tubes, each connecting a respective air fork outlet to a respective teatcup;

one or more vacuum pulsation lines connected to said one or more air fork inlets;

a milk hose connected to said claw outlet and extending over said curb;

a milk hose positioner bearing against said curb and supporting said hose and applying in combination with said hose a forward force to said claw.

2. The invention according to claim 1 wherein said positioner is attached to said milk hose and stays on said milk hose when said teatcups are removed from said teats and said milking cluster is moved from said milking position.

3. The invention according to claim 1 wherein said positioner has a stop surface stopped against said curb when said milking cluster is in said milking position, to stop rearward movement of said positioner such that said positioner and said hose apply a forward force on said claw to better balance weight distribution on said teats.

4. The invention according to claim 3 wherein said stop surface permits forward movement of said positioner if said animal steps forwardly.

5. The invention according to claim 3 wherein said stop surface permits lateral movement of said positioner along said curb if said animal shifts sideways.

6. A milk hose positioner for a milking cluster for a dairy animal having an udder and a plurality of teats, and milked in a parlor having a milking platform for supporting the animal, a pit for supporting a milking attendant, and a curb between said milking platform and said pit, the animal having a milking position on said platform with its head facing forwardly away from said pit, and its rump facing rearwardly toward said pit, such that the attendant has access to said teats, said cluster comprising a claw having a plurality of inlets, and an outlet, said milking cluster having a milking position with said claw beneath said udder, a plurality of teatcups, each connected to a respective teat, a plurality of milk tubes, each connecting a respective claw inlet to a respective teatcup, an air fork having a plurality of outlets, and one or more inlets, a plurality of air tubes, each connecting a respective air fork outlet to a respective teatcup, one or more vacuum pulsation lines connected to said one or more air fork inlets, and a milk hose connected to said claw outlet and extending over said curb, said positioner comprising a bracket bearing against said curb and supporting said milk hose and applying in combination with said milk hose a forward force to said claw to better balance weight distribution on said teats, said milk hose positioner being attached to said milk hose and staying on said milk hose when said teatcups are removed from said teats and said milking cluster is moved from said milking position, said milk hose positioner comprising a bracket slidable along said milk hose when said bracket is removed from said curb, and wherein said milk hose remains stationary on said bracket when unattended and said milking cluster is in said milking position.

7. The invention according to claim 6 wherein the position of said milk hose relative to said milking cluster and said curb is manually adjustable by said attendant while said bracket is on said curb.

8. The invention according to claim 6 wherein said curb has a top, and a lip spaced below said top on the side of said curb facing said milking platform, and said bracket has an opening receiving said milk hose extending therethrough, first and second bent side ears on said top of said curb, and a bent lower ear under said lip.

9. The invention according to claim 6, wherein said bracket has a first opening receiving said milk hose extending therethrough, and a second opening receiving said one or more vacuum pulsation lines extending therethrough.

10. The invention according to claim 9 wherein said second opening is above said first opening.

11. The invention according to claim 9 wherein said second opening is below said first opening.

12. The invention according to claim 9 wherein said first opening is a closed-loop slot, and said second opening is an open-loop slot.

13. The invention according to claim 9 wherein both of said first and second openings are closed-loop slots.

14. The invention according to claim 9 comprising a pair of said vacuum pulsation lines extending through said second opening, said second opening being an open-loop slot permitting lateral entry and exit of said vacuum pulsation line pair.

15. The invention according to claim 14 wherein said vacuum pulsation line pair comprises a pair of tubes connected by a web, said second opening has an entry portion of a width slightly greater than the diameter of one of said tubes, and a receptacle portion of a width greater than twice said diameter plus the width of said web.

16. The invention according to claim 15 wherein said vacuum pulsation line pair is removed from said second opening by turning the vacuum pulsation line pair 90° and then laterally removing same through said entry portion.

17. The invention according to claim 6 wherein said bracket has an adjustable clamp engaging said milk hose and applying adjustable clamping force thereagainst, said clamp being adjusted to be tight enough to hold said milk hose stationary on said bracket to apply said forward force to said claw, yet loose enough to permit said attendant to slide said bracket along said milk hose to adjust to the distance between said curb and an alignment point beneath said udder.

18. The invention according to claim 6 wherein said bracket has a variable guillotine opening receiving said milk hose extending therethrough and engaging said milk hose with variable clamping force.

19. The invention according to claim 18 wherein said positioner comprises a slide plate slidably mounted to said bracket and moveable relative thereto to change the size of said opening.

20. The invention according to claim 19 wherein said slide plate and said bracket in combination engage said milk hose at three points spaced approximately 120° apart, to maintain a substantially circular shape of said milk hose, and prevent elliptical shaping of said milk hose otherwise causing kinking or collapsing of the latter.

21. The invention according to claim 20 wherein said opening in said bracket engages said milk hose at one of said three points, and said slide plate engages said milk hose at the other two of said three points.

22. The invention according to claim 21 wherein said slide plate has an elliptical arc of smaller radius than the radius of said milk hose, said arc having a central portion spaced from said milk hose, said arc having end portions engaging said milk hose.

23. The invention according claim 22 wherein said opening in said bracket is circular and of greater radius than the radius of said milk hose.

24. A milk hose positioner for a milking cluster for a dairy animal having an udder and a plurality of teats, and milked in a parlor having a milking platform for supporting the animal, a pit for supporting a milking attendant, and a curb between said milking platform and said pit, the animal having a milking position on said platform with its head facing forwardly away from said pit, and its rump facing rearwardly toward said pit, such that the attendant has access to said teats, said cluster comprising a claw having a plurality of inlets, and an outlet, said milking cluster having a milking position with said claw beneath said udder, a plurality of teatcups, each connected to a respective teat, a plurality of milk tubes, each connecting a respective claw inlet to a respective teatcup, an air fork having a plurality of outlets, and one or more inlets, a plurality of air tubes, each connecting a respective air fork outlet to a respective teatcup, one or more vacuum pulsation lines connected to said one or more air fork inlets, and a milk hose connected to said claw outlet and extending over said curb, said curb having a front surface facing said milking platform, and a rear surface facing said pit, said milk hose positioner comprising a bracket loosely received on said curb and supporting said milk hose, said bracket extending along said front surface of said curb and having rearwardly extending side ears engaging said curb to support said bracket therefrom, said side ears permitting left and right lateral movement of said bracket along said curb in response to left and right lateral movement of the animal and forward movement of said bracket away from said curb in response to forward movement of the animal, and wherein said curb prevents rearward movement of said bracket, said bracket applying in combination with said milk hose a forward force to said claw to better balance weight distribution on said teats.

25. The invention according to claim 23 wherein said bracket has an opening receiving said milk hose extending therethrough, said bracket being rockable on said ears about said curb to reduce the effective diameter of said opening in response to a rearward force on said milk hose whereby to prevent rearward movement of said milk hose through said opening and instead apply forward reactive force countering same.

26. The invention according to claim 25 wherein said bracket is manually rockable by the attendant to maximize the effective diameter of said opening and permit sliding movement of said milk hose therethrough to in turn set the amount of reactive force applied forwardly against said claw.

* * * * *